United States Patent
Bakran et al.

(10) Patent No.: US 10,491,139 B2
(45) Date of Patent: Nov. 26, 2019

(54) CONVERTER ASSEMBLY AND METHOD FOR OPERATING SAME

(71) Applicant: SIEMENS AKTIENGESELLSCHAFT, Munich (DE)

(72) Inventors: Mark-Matthias Bakran, Erlangen (DE); Viktor Hofmann, Bayreuth (DE); Andre Schoen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/329,776

(22) PCT Filed: Sep. 1, 2016

(86) PCT No.: PCT/EP2016/070637
§ 371 (c)(1),
(2) Date: Mar. 1, 2019

(87) PCT Pub. No.: WO2018/041357
PCT Pub. Date: Mar. 8, 2018

(65) Prior Publication Data
US 2019/0245459 A1    Aug. 8, 2019

(51) Int. Cl.
*H02M 7/797* (2006.01)
(52) U.S. Cl.
CPC .................. *H02M 7/797* (2013.01)
(58) Field of Classification Search
CPC .......... H02M 7/797; H02M 7/00; H02M 7/68; H02M 7/757; H02M 1/00;
(Continued)

(56) References Cited

U.S. PATENT DOCUMENTS

| 9,595,835 B2 | 3/2017 | Alters et al. |
| 2006/0258088 A1 | 11/2006 | Allers et al. |

(Continued)

FOREIGN PATENT DOCUMENTS

| WO | 2005041300 A1 | 5/2005 |
| WO | 2012013245 A1 | 2/2012 |

OTHER PUBLICATIONS

Lanhua, Zhang, et al.: "Voltage balancing control of a novel modular multilevel converter", Electric Utility Deregulation and Restructuring and Power Technologies (DRPT), 2011 4th International Conference on, IEEE, (Jul. 6, 2011), doi:10.1109/DRPT.2011.5993872, ISBN 978-1-4577-0364-5, pp. 109-114, XP032039111 [A] 1-16 * the whole document *.

(Continued)

*Primary Examiner* — Adolf D Berhane
(74) *Attorney, Agent, or Firm* — Laurence Greenberg; Werner Stemer; Ralph Locher

(57) ABSTRACT

A modular converter assembly has at least one AC voltage terminal and at least two DC voltage terminals. The DC voltage terminals are formed by the outer terminals of a series circuit and the AC voltage terminal is formed by the connecting node between two sub-circuits of the series circuit. Capacitors of submodules of the subcircuits are activated or deactivated based on their capacitor voltages. The capacitors are operated exclusively in a unipolar mode or exclusively in a bipolar mode. In a time period in which the temporal mean value of the current flowing through the sub-circuit has a different sign than the actual current flowing through the sub-circuit, capacitors operating in a unipolar mode are preferred over capacitors operating in a bipolar manner. That is, the unipolar capacitors are reactivated or remain activated. A selection loop is carried out (Continued)

repeatedly to select the capacitors for activation or deactivation.

19 Claims, 3 Drawing Sheets

(58) Field of Classification Search
CPC ......... H02M 2001/0064; H02M 7/219; H02M 1/088; H02M 1/12; H02J 3/36
See application file for complete search history.

(56) References Cited

U.S. PATENT DOCUMENTS

| | | | |
|---|---|---|---|
| 2013/0200859 A1 | 8/2013 | Jiang-Haefner et al. | |
| 2015/0256081 A1* | 9/2015 | Bakran | H02M 3/33584 363/21.01 |
| 2016/0036316 A1* | 2/2016 | Momota | H02M 1/08 363/78 |
| 2016/0311644 A1* | 10/2016 | Agirman | B66B 1/302 |
| 2018/0076735 A1* | 3/2018 | Bakran | H02H 7/1222 |
| 2019/0052187 A1* | 2/2019 | Geske | H02M 1/32 |
| 2019/0165692 A1* | 5/2019 | Armschat | H01F 27/38 |
| 2019/0199237 A1* | 6/2019 | Dorn | H02M 7/49 |

OTHER PUBLICATIONS

Marquardt, R., "Modular Multilevel Converter: An universal concept for HVDC-Networks and extended DC-Bus-applications", The 2010 International Power Electronics Conference, pp. 502 to 507.
Weixing Lin, et al.: "Full Bridge MMC Converter Optimal Design to HVDC Operational Requirements" IEEE 2015; 2015.
Schön, André: "Gleichspannungswandler für die Hochspannungsgleichstromübertragung" p. 42-45; 2015.
Zeng, Rong, et al.; "Design and Operation of a Hybrid Modular Multilevel Converter".
Zhang, Lanhua, et al. "Voltage Balancing Control of a Novel Modular Multilevel Converter", Electric Utility Deregulation and Restructuring and Power Technologies (DRPT), 2011 4th International Conference on IEEE, (Jul. 6, 2011), pp. 109-114.

* cited by examiner

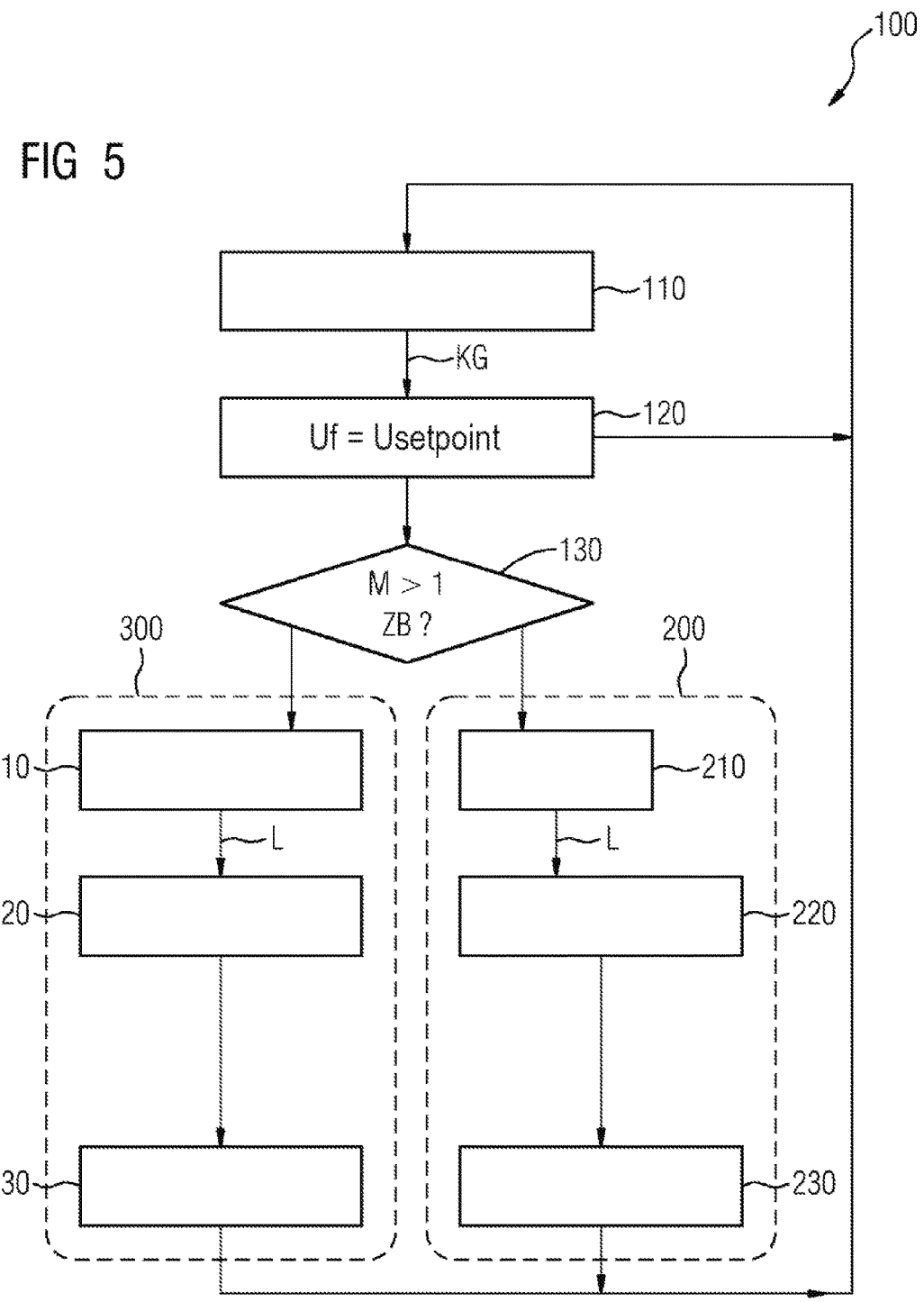

CONVERTER ASSEMBLY AND METHOD FOR OPERATING SAME

BACKGROUND OF THE INVENTION

Field of the Invention

The present invention relates to a method for controlling a converter assembly, and a converter assembly which can be correspondingly operated.

The publication "Modular Multilevel Converter: An universal concept for HVDC-Networks and extended DC-Bus-applications" (R. Marquardt, The 2010 International Power Electronics Conference, pp. 502 to 507) discloses a method for operating a converter assembly. The previously known converter assembly comprises series circuits of which the external connections form the DC voltage terminals of the converter assembly. The series circuits respectively comprise two subcircuits connected in series, of which the electrical connecting points respectively form an AC voltage terminal of the converter assembly. The subcircuits respectively comprise at least two submodules connected in series respectively comprising at least two switches and one capacitor. The converter assembly is controlled by controlling the submodules.

SUMMARY OF THE INVENTION

The object of the present invention is to provide a method for controlling a converter assembly, in which, in the case that more submodules are available than are instantaneously required for switching the respectively required voltages, a particularly suitable selection is carried out of the submodules, or rather the capacitors, which are to be connected or which are to remain connected by means of the internal switches of the submodules.

This object is achieved via a method having the features as claimed. Advantageous embodiments of the method according to the present invention are provided in dependent claims.

Accordingly, according to the present invention, it is provided that in at least one of the subcircuits, at least one capacitor is operated exclusively in unipolar mode and at least one capacitor is operated in bipolar mode, wherein in a time range in which the time average of the current flowing through the subcircuit has a sign which is different from that of the respective instantaneous current flowing through the subcircuit, the capacitor or capacitors operating in unipolar mode are given preference over the capacitor or capacitors operated in bipolar mode, in particular, are preferably connected or preferably remain connected.

Connecting a capacitor is to be understood to mean that said capacitor is electrically switched into or inserted into the series circuit by means of the switches of its submodule, so that said capacitor subsequently influences the voltage at the series circuit as a function of its capacitor voltage. Disconnecting the capacitor is to be understood to mean that said capacitor is electrically cut off from the series circuit by means of the switches of its submodule.

A significant advantage of the method according to the present invention may be seen in the fact that said method enables operation making equal use, and thus having similar electrical and thermal loading, of all submodules, for example, also for the case that the arrangement is operated at a modulation index greater than 1, and capacitors are present in the submodules capacitors which are to be operated, or may be operated, only in unipolar mode, as well as those which are operated in bipolar mode. By means of the preference according to the present invention of the capacitors operated in unipolar mode over the capacitors operated in bipolar mode, that capacitors operated in unipolar mode take part in the operation in an underrepresented manner, and the capacitors operated in bipolar mode are loaded in an above-average manner. The time average of the current flowing through the submodules is generally not zero, but is shifted by an offset, so that the time spans having a positive current flow and a negative current flow have an unequal duration. For example, in the case of a modulation index greater than 1, having a polarity which is opposite the main current direction from the point of view of the time profile, capacitors operated in unipolar mode are limited in energy, and can be charged or discharged only during relatively short time ranges, in particular, when the time average of the current flowing through the subcircuit has a sign which is different from that of the respective instantaneous current flowing through the subcircuit. By giving preference to the capacitors operated in unipolar mode, or rather the submodules comprising the capacitors operated in unipolar mode, in the time ranges in which they are limited in energy, over the capacitors operated in bipolar mode, or rather, the submodules comprising the capacitors operated in bipolar mode, the described problem is significantly reduced.

As indicated above, it is particularly advantageous if the described method, i.e., giving preference to the capacitors operated in unipolar mode over the capacitors operated in bipolar mode, is carried out if the subcircuit is operated having a modulation index greater than 1.

The modulation index results from the quotient between twice the amplitude, or rather, twice the peak value of the AC voltage on the AC voltage side of the converter assembly, and the DC voltage on the DC voltage side of the converter assembly. The modulation index is thus calculated accordingly:

$$M = 2\hat{U}_L / Udc$$

where M is the modulation index and Udc is the DC voltage between the DC voltage terminals of the converter assembly. $\hat{U}_L$ denotes the peak value, or rather, the amplitude, of the voltage between the AC voltage terminal or terminals, and the potential center point on the DC voltage side. The potential center point corresponds to the average potential between the DC voltage terminals.

The activation of the subcircuit preferably takes place in a selection loop which is executed repeatedly in a chronologically successive manner, or rather, is carried out repeatedly, wherein in each selection loop cycle, it is respectively ascertained whether capacitors must be connected or disconnected for setting a predetermined subcircuit setpoint voltage.

In the selection loop, it is preferably checked whether said loop is carried out in the aforementioned time range, i.e., in the time range in which the time average of the current flowing through the subcircuit has a sign which is different from that of the respective instantaneous current flowing through the subcircuit.

If this is the case, the capacitors operated in unipolar mode are given preference in the selection loop over the capacitors operated in bipolar mode, in particular are preferably connected or preferably left connected; otherwise, the capacitors operated in unipolar mode, and the capacitors operated in bipolar mode which are operated having the same polarity as the capacitors operated in unipolar mode, are handled equally in the selection loop, in particular are connected, left connected, or disconnected only with respect to their capacitor voltages.

It is advantageous if a sorting list having a prioritization of the capacitors is initially created in the selection loop; based on the prioritization in the sorting list, the capacitors to be disconnected or connected for achieving the predetermined subcircuit setpoint voltage are ascertained, and the disconnection or connection of the capacitors takes place according to the ascertainment result of the ascertainment step.

In the case that in the aforementioned time range, the instantaneous subcircuit voltage exceeds the predetermined subcircuit setpoint voltage, all connected capacitors operated in bipolar mode are preferably added to the sorting list as capacitors to be deactivated, having higher priority than the connected capacitors operated in unipolar mode, wherein in the sorting list, the sequence of the capacitors operated in bipolar mode among one another is sorted according to their capacitor voltage, and the sequence of the capacitors operated in unipolar mode among one another is likewise sorted according to their capacitor voltage. The ultimate selection of the capacitors to be disconnected preferably takes place according to the sequence in the sorting list, i.e., beginning with the capacitors operated in bipolar mode and only subsequently with the capacitors operated in unipolar mode, until the sum of the capacitor voltages of the remaining capacitors corresponds to the predetermined subcircuit setpoint voltage, or at least corresponds up to a predetermined residual error, or falls below said voltage.

In the case that in the aforementioned time range, the instantaneous subcircuit voltage falls below the predetermined subcircuit setpoint voltage, all disconnected capacitors operated in unipolar mode are preferably added to the sorting list as capacitors to be connected, having higher priority than the disconnected capacitors operated in bipolar mode, wherein the sequence of the capacitors operated in unipolar mode among one another is sorted according to their capacitor voltage, and the sequence of the capacitors operated in bipolar mode among one another is likewise sorted according to their capacitor voltage. The ultimate selection of the capacitors to be connected preferably takes place according to the sequence in the sorting list, i.e., beginning with the capacitors operated in unipolar mode and only subsequently with the capacitors operated in bipolar mode, until the sum of the capacitor voltages of the selected capacitors corresponds to the predetermined subcircuit setpoint voltage, or at least corresponds up to a predetermined residual error, or exceeds said voltage.

It is considered to be particularly advantageous if the selection of the capacitors which are operated in bipolar mode and which are to be disconnected takes place according to their capacitor voltages, wherein the selection direction, i.e., whether bipolar capacitors having higher capacitor voltage are initially selected over those having lower capacitor voltage, is determined as a function of the power flow direction of the converter assembly, as a function of the current direction through the subcircuit, and a function of whether the instantaneous subcircuit voltage exceeds or falls below the predetermined subcircuit setpoint voltage.

The selection of the capacitors which are operated in unipolar mode and which are to be disconnected preferably also takes place according to their capacitor voltages, wherein the selection direction, i.e., whether unipolar capacitors having higher capacitor voltage with respect to those having lower capacitor voltage are initially selected, is determined as a function of the power flow direction of the converter assembly, as a function of the current direction through the subcircuit, and as a function of whether the instantaneous subcircuit voltage exceeds or falls below the predetermined subcircuit setpoint voltage.

In the selection loop, a virtual capacitor group is preferably formed in each case, which is made up of the connected capacitors operated in a unipolar and bipolar mode, as well as a fixedly predetermined maximum number of capacitors operated in unipolar mode which are to be selected but which are still disconnected. The capacitor voltages of the virtual capacitor group are preferably added while forming a virtual voltage value.

The virtual voltage value is preferably considered to be an instantaneous subcircuit voltage and is used as the instantaneous subcircuit voltage for the comparison with the subcircuit setpoint voltage which is already described above. The comparison thus takes place in this variant not based on the sum of the capacitor voltages of the connected capacitors of the subcircuit, but rather based on the virtual sum of the capacitor voltages of the capacitors of the capacitor group, although said group also comprises capacitors which are "still" disconnected.

The selection of the capacitors which are operated in unipolar mode and which are to be selected, but which are still disconnected, from the overall group of disconnected capacitors operated in unipolar mode, preferably takes place according to their capacitor voltages.

The virtual capacitor group is preferably formed with the disconnected unipolar capacitors which have the lowest capacitor voltages in the case of a power flow direction of the converter assembly in the direction of the DC voltage terminals, and which have the highest capacitor voltages in the case of a power flow direction of the converter assembly in the direction of the AC voltage terminal or terminals.

When creating the sorting list, all capacitors in the virtual capacitor group are preferably added to the sorting list, wherein the capacitors in the sorting list which are operated in unipolar mode and which are selected but are still disconnected physically, are handled like connected capacitors operated in unipolar mode, i.e., exactly like the capacitors operated in unipolar mode which are physically connected.

In addition, it is advantageous if, in an ascertainment step in the selection loop, the capacitors which are to be disconnected or connected for achieving the predetermined subcircuit setpoint voltage are ascertained, based on the sorting of the sorting list, and in an implementation step, the disconnection or connection of the capacitors takes place according to the ascertainment result of the ascertainment step, wherein the capacitors which are operated in unipolar mode and which are selected but still physically disconnected, remain disconnected if they were to be disconnected according to the ascertainment result, and are connected if they are to remain connected according to the ascertainment result.

All capacitors of the subcircuit which are operated in unipolar mode are preferably operated having the same polarity.

In addition, the present invention relates to a converter assembly which comprises at least one AC voltage terminal at which an alternating current may be fed or drawn, and at least two DC voltage terminals at which a direct current may be fed or drawn, wherein the converter assembly comprises at least one series circuit of which the external terminals form the DC voltage terminals of the converter assembly, the series circuit comprises two subcircuits connected in series, of which the electrical connection point forms the AC voltage terminal or one of the AC voltage terminals of the converter assembly, and the subcircuits respectively comprise at least two submodules connected in series which respectively comprise at least two switches and one capacitor, and wherein the converter assembly comprises a control device for activating the submodules.

According to the present invention, it is provided that the control device is designed in such a way that it can activate the submodules, in particular their switches connecting or disconnecting the respective capacitor, according to a method as described above.

With respect to the advantages of the converter assembly according to the present invention, reference is made to the aforementioned embodiments.

The control device preferably comprises a computing device and a memory. In the memory, a control program module is preferably stored which determines the functioning of the computing device in such a way that the computing device can carry out an activation method as described above, during the execution of the control program module.

BRIEF DESCRIPTION OF THE SEVERAL VIEWS OF THE DRAWING

The present invention will be described in greater detail below based on exemplary embodiments; the following are shown by way of example:

FIG. 5 shows, by way of example, a possible operating method for activating the converter assembly according to FIG. 1.

For the sake of clarity, in the figures, the same reference characters are always used for identical or comparable components.

DESCRIPTION OF THE INVENTION

Figure 1:
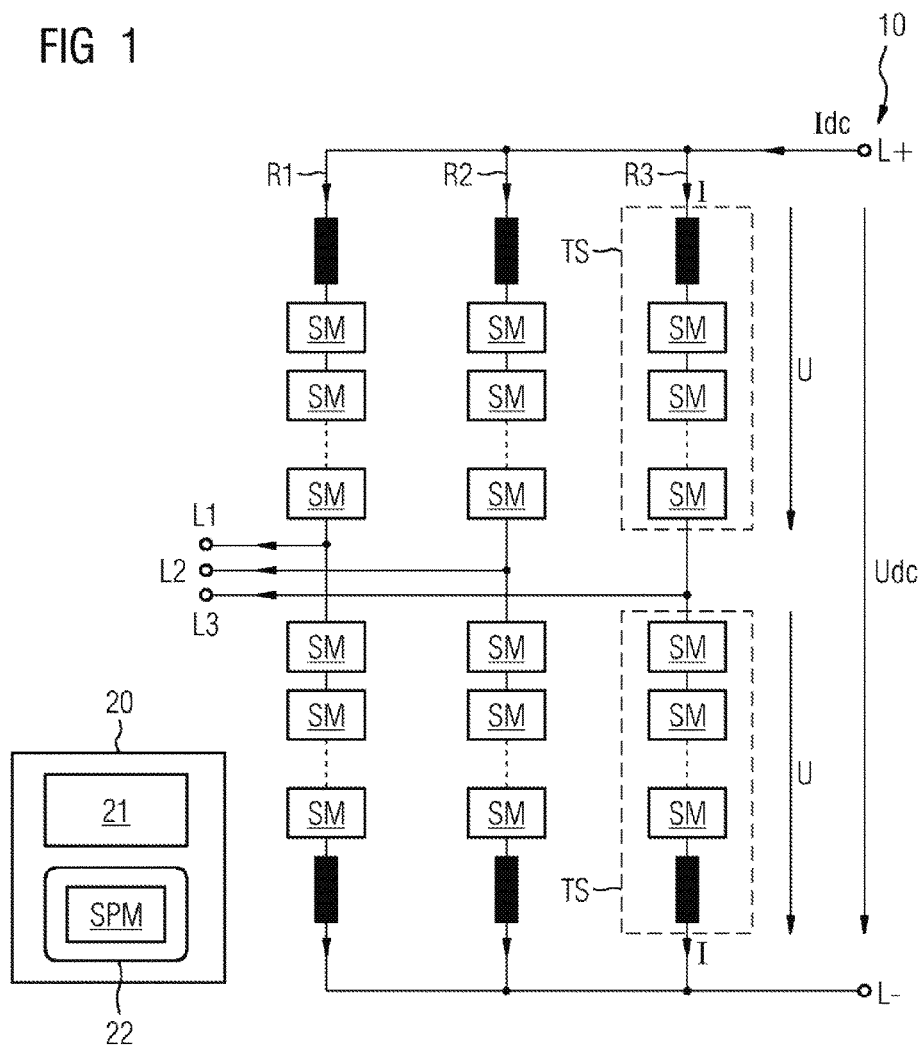
FIG. 1 shows an exemplary embodiment of a converter assembly according to the present invention.

FIG. 1 shows a converter assembly 10 which comprises three AC voltage terminals L1, L2, and L3, at which an alternating current can be fed into the converter assembly 10 or drawn from it. Two DC voltage terminals, at which a direct current Idc can be fed into the converter assembly 10 or drawn from it, are identified in FIG. 1 by the reference characters L+ and L−. The DC voltage at the DC voltage terminals L+ and L− is labeled with the reference character Udc.

The converter assembly 10 comprises three series circuits R1, R2, and R3, of which the external terminals form the DC voltage terminals L+ and L− of the converter assembly 10. The series circuits R1, R2, and R3 respectively comprise two subcircuits TS which are connected in series.

Each of the subcircuits TS respectively comprises at least two submodules SM which are connected in series, which respectively comprise at least two switches and one capacitor. Exemplary embodiments of suitable submodules SM will be described below by way of example in connection with FIGS. 2 and 3.

The converter assembly 10 comprises a control device 20 which is suitable for activating the submodules SM and thus for activating the subcircuits TS. For this purpose, the control device 20 comprises a computing device 21 and a memory 22. A control program module SPM is stored in the memory 22, which determines the functioning of the computing device 21.

Each of the subcircuits TS of the three series circuits R1, R2, and R3 respectively comprises at least one capacitor which is operated exclusively in unipolar mode or which may be operated exclusively in unipolar mode, and at least one capacitor which is operated in bipolar mode.

A possible operating method for the converter assembly 10 will be described in greater detail further below in connection with FIG. 5. With a view to the polarities, in connection with FIG. 5, it is assumed that the capacitors which are operated in unipolar mode are operated at a positive voltage in the direction of the arrow of the voltage U in FIG. 1. The direction of the current flowing through the subcircuits TS is considered to be positive if said current flows in the direction of the arrow of the current I in FIG. 1. The power flow direction is considered to be positive if the power flows from the DC voltage side to the AC voltage side of the converter assembly 10.

Figure 2:
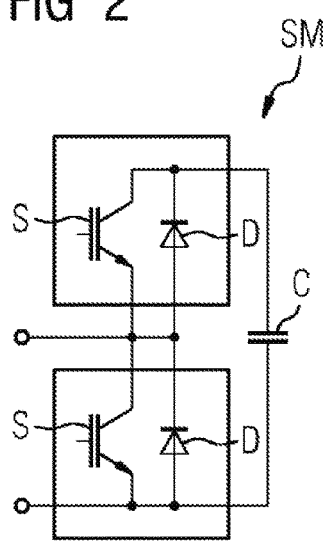
FIG. 2 shows an exemplary embodiment of a submodule which may be used for forming subcircuits in the converter assembly according to FIG. 1.

FIG. 2 shows an exemplary embodiment of a submodule SM which comprises two switches S, two diodes D, and one capacitor C. The aforementioned components form a half-bridge circuit which enables only, or rather, exclusively, unipolar operation of the capacitor C, by activating the switches S on the part of the control device 20 according to FIG. 1. At least one of the submodules SM of each subcircuit TS according to FIG. 1 is advantageously designed as depicted in FIG. 2.

Figure 3:
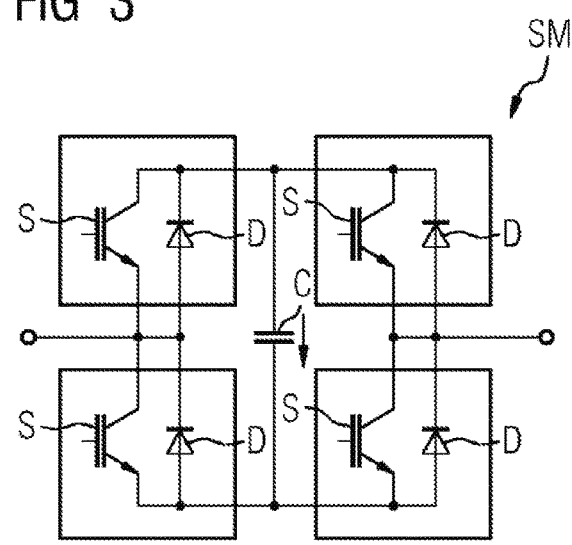
FIG. 3 shows another exemplary embodiment of a submodule which may be used for forming subcircuits in the converter assembly according to FIG. 1.

FIG. 3 shows an exemplary embodiment of a submodule SM which comprises four switches S, four diodes D, and one capacitor C. The aforementioned components form a full bridge circuit, which enables bipolar operation of the capacitor C, by activating the switches S on the part of the control device 20 according to FIG. 1. At least one of the submodules SM of each subcircuit TS of the converter assembly 10 according to FIG. 1 is preferably designed as shown in FIG. 3.

Figure 4:
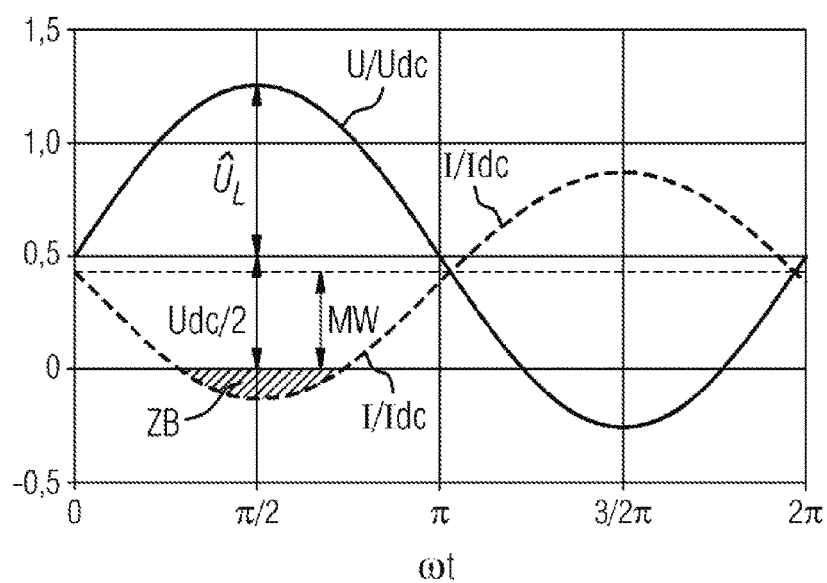
FIG. 4 shows, by way of example, the profile of the voltage and current at, or rather, flowing through, one of the subcircuits of the converter assembly according to FIG. 1.

FIG. 4 shows possible operation of the converter assembly 10 according to FIG. 1, in which the modulation index is greater than 1. The modulation index M is greater than 1 if the following is true:

$$M=2\hat{U}_L/Udc>1$$

where M is the modulation index and Udc is the DC voltage between the DC voltage terminals of the converter assembly. $\hat{U}_L$ denotes the peak value, or rather, the amplitude of the voltage between the AC voltage terminals L1, L2, and L3, and the potential center point on the DC voltage side. The potential center point on the DC voltage side corresponds to the average potential between the DC voltage terminals L+ and L−, and thus the potential at the DC voltage terminal L+ shifted by −Udc/2, or rather, the potential at the DC voltage terminal L− shifted by +Udc/2.

FIG. 4 shows, by way of example, the profile of the voltage U at one of the subcircuits TS according to FIG. 1, and the current I flowing through this subcircuit TS, respectively normalized to the voltage Udc and the current Idc. In FIG. 4, it is apparent that there is a periodically recurring time range ZB in which the time average MW of the current I flowing through the subcircuit TS has a sign which is different from that of the respective instantaneous current I flowing through the subcircuit.

In the time ranges ZB, the capacitors operated in unipolar mode are preferably handled preferentially with respect to the capacitors operated in bipolar mode, in particular, are preferentially connected if they were previously disconnected, or are preferentially left connected if they were connected at the respective point in time. The connection or disconnection of the capacitors takes place by means of the switches S of the respective submodules SM according to FIGS. 2 and 3.

In connection with FIG. 5, a preferred operating method for activating the converter assembly 10 according to FIG. 1 will be described in greater detail below.

The activation of the converter assembly 10 according to FIG. 1 preferably takes place in a selection loop 100 which is executed repeatedly.

The selection loop 100 comprises a group formation step 110 in which a virtual capacitor group KG is formed, which is made up of the respective connected capacitors which are operated in unipolar mode, and the respective connected capacitors which are operated in bipolar mode, as well as a fixedly predetermined maximum number of capacitors which are operated in unipolar mode and which are to be selected but which are still disconnected.

The selection of the capacitors which are operated in unipolar mode and which are to be selected but which are still disconnected, from the overall group of the disconnected capacitors operated in unipolar mode, preferably takes place as a function of their respective capacitor voltage, as follows.

In the case of a power flow direction of the converter assembly 10 according to FIG. 1 in the direction of the DC voltage terminals L+ and L−, the disconnected unipolar capacitors which have the lowest capacitor voltages are preferably added to the virtual capacitor group KG.

In the case of a power flow direction of the converter assembly 10 in the direction of the AC voltage terminal or terminals L1, L2 and L3, the virtual capacitor group KG is preferably formed by the disconnected unipolar capacitors which have the highest capacitor voltages.

In a subsequent voltage comparison step 120, the capacitor voltages of the capacitors of the virtual capacitor group KG are added while forming a virtual voltage value Uf for which it is assumed hereinafter that said voltage value represents the instantaneous subcircuit voltage U at the subcircuit TS, which, due to the additionally selected capacitors which are operated in unipolar mode but which are actually still disconnected, is of course not the case, and is in this case hereinafter assumed only for carrying out the method.

Within the scope of the voltage comparison step 120, the virtual voltage value Uf is compared to a subcircuit setpoint voltage Usetpoint which is predetermined for the subcircuit TS. If the virtual voltage value Uf corresponds to the predetermined subcircuit setpoint voltage Usetpoint, all capacitors in the virtual capacitor group KG are connected or left connected, and a return is made to the group formation step 110.

If the virtual voltage value Uf differs from the predetermined subcircuit setpoint value, a jump is made to a special handling test step 130.

In the special handling test step 130, it is checked whether the converter assembly 10 according to FIG. 1 is operated having a modulation index M greater than 1. If this is the case, it is checked whether the activation takes place in the time range ZB which is marked in FIG. 4, i.e., in the time range in which the time average MW of the current I flowing through the subcircuit TS has a sign which is different from that of the respective instantaneous current I flowing through the subcircuit.

If is determined in the special handling test step 130 that the activation takes place in the time range ZB, the further activation takes place according to a special handling path 200. Otherwise, the further activation of the converter assembly 10 takes place according to a normal handling path 300.

In the special handling path 200, within the scope of a sorting list step 210, a sorting list L is initially created in which the capacitors of the virtual capacitor group KG are listed having a prioritization. The listing takes place in groups, wherein capacitors operated in bipolar mode and capacitors operated in unipolar mode are added in separate subgroups. The formation of the subgroups and the formation of the prioritization preferably takes place as follows.

In the case that in the time range ZB, the virtual voltage value Uf exceeds the predetermined subcircuit setpoint voltage Usetpoint, all connected capacitors operated in bipolar mode are added to the sorting list as capacitors to be disconnected, having higher priority than the connected capacitors operated in unipolar mode, wherein in the sorting list, the sequence of the capacitors operated in bipolar mode among one another is sorted according to their capacitor voltage, and the sequence of the capacitors operated in unipolar mode among one another is likewise sorted according to their capacitor voltage.

In the case that in the aforementioned time range, the virtual voltage value Uf falls below the predetermined subcircuit setpoint voltage, all disconnected capacitors operated in unipolar mode are added to the sorting list as capacitors to be connected, having higher priority than the disconnected capacitors operated in bipolar mode, wherein the sequence of the capacitors operated in unipolar mode among one another is sorted according to their capacitor voltage, and the sequence of the capacitors operated in bipolar mode among one another is likewise sorted according to their capacitor voltage.

The sorting of the capacitors operated in unipolar and bipolar mode takes place in their respective subgroup, respectively preferably in the ascending direction to higher capacitor voltages,
- if the power flow direction is positive, the current direction is negative and the instantaneous subcircuit voltage (or rather, the virtual voltage value Uf) exceeds the predetermined subcircuit setpoint voltage Usetpoint, and
- if the power flow direction is negative, the current direction is positive and the instantaneous subcircuit voltage (or rather, the virtual voltage value Uf) falls below the predetermined subcircuit setpoint voltage Usetpoint.

Otherwise, the sorting takes place in the reverse direction.

In a subsequent ascertainment step 220, it is determined which of the capacitors in the sorting list L are to be connected, are to remain connected, are to be disconnected, or are to remain disconnected. The selection of the capacitors from the sorting list L takes place as follows.

In the case that in the aforementioned time range ZB, the instantaneous subcircuit voltage (or rather, the virtual voltage value Uf) exceeds the predetermined subcircuit setpoint voltage Usetpoint, the ultimate selection of the capacitors to be disconnected takes place according to the sequence in the sorting list, i.e., beginning with the capacitors operated in bipolar mode and only subsequently with the capacitors operated in unipolar mode, until the sum of the capacitor voltages of the remaining capacitors corresponds to the predetermined subcircuit setpoint voltage Usetpoint, or at least corresponds up to a predetermined residual error, or falls below said voltage.

In the case that in the aforementioned time range ZB, the instantaneous subcircuit voltage (or rather, the virtual voltage value Uf) falls below the predetermined subcircuit setpoint voltage Usetpoint, the ultimate selection of the capacitors to be connected takes place according to the sequence in the sorting list, i.e., beginning with the capacitors operated in unipolar mode and only subsequently with the capacitors operated in bipolar mode, until the sum of the capacitor voltages of the selected capacitors corresponds to the predetermined subcircuit setpoint voltage Usetpoint, or at least corresponds up to a predetermined residual error, or exceeds said voltage.

The selection of the capacitors operated in unipolar and bipolar mode within the respective group thus preferably takes place in the above-described preferred sorting sequence in the sorting list L, or in other words, in the ascending direction to higher capacitor voltages,
- if the power flow direction is positive, the current direction is negative and the instantaneous subcircuit voltage (or rather, the virtual voltage value Uf) exceeds the predetermined subcircuit setpoint voltage Usetpoint, and
- if the power flow direction is negative, the current direction is positive and the instantaneous subcircuit voltage (or rather, the virtual voltage value Uf) falls below the predetermined subcircuit setpoint voltage Usetpoint.

Otherwise, the selection takes place in the reverse direction i.e., in the descending direction to lower capacitor voltages.

With a view to the polarities, or rather directions, it is assumed here by way of example that positive voltages are those in the direction of the arrow of the voltage U in FIG. 1. The direction of the current flowing through the subcircuits TS is considered to be positive if said current flows in the direction of the arrow of the current I in FIG. 1. The power flow direction is considered to be positive if the power flows from the DC voltage side to the AC voltage side of the converter assembly 10.

In a subsequent implementation step 230, the disconnection or connection of the capacitors takes place according to the ascertainment result of the ascertainment step 220. In this case, the capacitors which are operated in unipolar mode and which are selected but are physically still disconnected, remain disconnected if they were to be disconnected according to the ascertainment result, and are connected if they are to be remain connected according to the ascertainment result.

After carrying out the implementation step 230, a return is made to the group formation step 110, and the selection loop 100 is subsequently executed in a new loop cycle.

If it is determined in the special handling test step 130 that the converter assembly is not operated in the time range ZB, in a sorting list step 310, the formation of a sorting list L preferably takes place in such a way that the capacitors operated in unipolar mode, and the capacitors operated in bipolar mode and having the same polarity, are handled equally. Different handling of the capacitors is preferably carried out only with respect to a differentiation between actually operated bipolar capacitors and inactive capacitors operated in bipolar mode.

In the case that the instantaneous subcircuit voltage (or rather, the virtual voltage value Uf) exceeds the predetermined subcircuit setpoint voltage Usetpoint, the connected capacitors operated in unipolar mode and the bipolar capacitors operated having the same polarity are preferably disconnected, before bipolar capacitors operated having negative polarity are connected.

In the case that the instantaneous subcircuit voltage (or rather, the virtual voltage value Uf) falls below the predetermined subcircuit setpoint voltage Usetpoint, the bipolar capacitors which are connected and are operated having negative polarity are preferably disconnected, before capacitors operated in unipolar mode and bipolar capacitors operated having the same polarity are connected.

After the selection of the capacitors to be disconnected or connected in an ascertainment step 320, the disconnection or connection is completed in a subsequent implementation step 330. Subsequently, a return is made again to the group formation step 110, and the selection loop 100 is subsequently executed again.

Although the present invention has been illustrated and described in greater detail via preferred exemplary embodiments, the present invention is not limited by the disclosed examples, and other variations may be derived therefrom by those skilled in the art, without departing from the protective scope of the present invention.

LIST OF REFERENCE CHARACTERS

10 Converter assembly
20 Control device
21 Computing device
22 Memory
100 Selection loop
110 Group formation step
120 Voltage comparison step
130 Special handling test step
200 Special handling path
210 Sorting list step
220 Ascertainment step
230 Implementation step
300 Normal handling path
310 Sorting list step
320 Ascertainment step
330 Implementation step
C Capacitor
D Diode
I Current
Idc Direct current
KG Virtual capacitor group
L Sorting list
L1 AC voltage terminal
L2 AC voltage terminal
L3 AC voltage terminal
L+ DC voltage terminal
L− DC voltage terminal
M Modulation index
MW Average value
R1 Series circuit
R2 Series circuit
R3 Series circuit
S Switch
SPM Control program module
SM Submodule
TS Subcircuit
U Voltage
Uf Virtual voltage value
Udc DC voltage at the DC voltage terminals
$\hat{U}_L$ Peak value of the voltage at the AC voltage terminals Usetpoint Subcircuit setpoint voltage
ZB Time range

The invention claimed is:

1. A method for controlling a converter assembly, the method comprising:
providing the converter assembly with at least one AC voltage terminal for outputting or drawing an alternating current and at least two DC voltage terminals for outputting or drawing a direct current, the converter assembly further having at least one series circuit with outer terminals that form the DC voltage terminals of the converter assembly, the series circuit including two subcircuits connected in series and having an electrical connecting node forming the AC voltage terminal or one of the AC voltage terminals of the converter assembly, and the subcircuits respectively including at least two submodules connected in series, each having at least two switches and one capacitor;
controlling the submodules and thus selectively connecting or disconnecting the respective capacitors of the submodules in dependence on a capacitor voltage of the respective capacitor;
in at least one of the subcircuits, exclusively operating at least one capacitor in unipolar mode and exclusively operating at least one capacitor in bipolar mode;
in a time period in which a temporal average value of a current flowing through the subcircuit has a sign which is different from a sign of a respective instantaneous current flowing through the subcircuit, giving preference to the capacitor or capacitors that are operated in unipolar mode over the capacitor or capacitors that are operated in bipolar mode in terms of connecting or keeping the capacitor or capacitors connected.

2. The method according to claim 1, which comprises controlling the subcircuit in a selection loop that is executed repeatedly, wherein the selection loop comprises ascertaining whether certain capacitors must be connected or disconnected for setting a predetermined subcircuit setpoint voltage.

3. The method according to claim 2, wherein the selection loop includes a voltage comparison step and the ascertaining step is effected in the voltage comparison step.

4. The method according to claim 2, which comprises:
checking in the selection loop whether the selection loop is carried out in the said time period in which the time average of the current flowing through the subcircuit has a sign which is different from that of the respectively instantaneous current flowing through the subcircuit; and
if this is the case, giving preference by connecting or keeping connected the capacitors that are operated in unipolar mode in the selection loop over the capacitors that are operated in bipolar mode; and
otherwise not giving preference and handling the capacitors that are operated in unipolar mode and the capacitors that are operated in bipolar mode and which are operated with the same polarity as the capacitors operated in unipolar mode, equally in the selection loop, and connecting, keeping connected, or disconnecting, only with respect to their capacitor voltages.

5. The method according to claim 4, which comprises checking whether the selection loop is carried out in the said time period in a special handling testing step of the selection loop.

6. The method according to claim 2, which comprises, in the selection loop:
initially, in a sorting list step, creating a sorting list having a prioritization of the capacitors;
in an ascertainment step, based on the prioritization of the capacitors in the sorting list, ascertaining those capacitors that are to be disconnected or connected for achieving the predetermined subcircuit setpoint voltage; and
selectively disconnecting or connecting the capacitors according to an ascertainment result obtained in the ascertainment step.

7. The method according to claim 6, which comprises:
if, in the said time period, the instantaneous subcircuit voltage exceeds the predetermined subcircuit setpoint voltage, adding all connected capacitors that are operated in bipolar mode to the sorting list as capacitors to be disconnected, having higher priority than the connected capacitors that are operated in unipolar mode;
in the sorting list, sorting a sequence of the capacitors that are operated in bipolar mode among one another according to their capacitor voltage, and likewise sorting a sequence of the capacitors that are operated in unipolar mode among one another according to their capacitor voltage; and
ultimately selecting the capacitors to be disconnected according to the sequence in the sorting list, i.e., beginning with the capacitors that are operated in bipolar mode and only subsequently with the capacitors that are operated in unipolar mode, until a sum of the capacitor voltages of the remaining capacitors equals the predetermined subcircuit setpoint voltage, or at least corresponds up to a predetermined residual error, or falls below predetermined subcircuit setpoint voltage.

8. The method according to claim 6, which comprises:
if, in the said time range, the instantaneous subcircuit voltage falls below the predetermined subcircuit setpoint voltage, adding all disconnected capacitors that are operated in unipolar mode to the sorting list as capacitors to be connected, having higher priority than the disconnected capacitors that are operated in bipolar mode;
in the sorting list, sorting a sequence of the capacitors that are operated in unipolar mode among one another according to their capacitor voltage, and likewise sorting a sequence of the capacitors that are operated in bipolar mode among one another according to their capacitor voltage; and
ultimately selecting the capacitors to be connected according to the sequence in the sorting list, beginning with the capacitors that are operated in unipolar mode and only subsequently with the capacitors that are operated in bipolar mode, untila sum of the capacitor voltages of the selected capacitors equals the predetermined subcircuit setpoint voltage, or at least corresponds up to a predetermined residual error, or exceeds the predetermined subcircuit setpoint voltage.

9. The method according to claim 6, which comprises:
selecting the capacitors that are operated in bipolar mode and that are to be disconnected according to their capacitor voltages, and determining a selection direction, namely, whether bipolar capacitors having a higher capacitor voltage are initially selected over bipolar capacitors having a lower capacitor voltage, as a function of a power flow direction of the converter assembly, as a function of a current direction through the subcircuit, and as a function of whether the instantaneous subcircuit voltage exceeds or falls below the predetermined subcircuit setpoint voltage; and selecting the capacitors that are operated in unipolar mode and that are to be disconnected according to their capacitor voltages, and determining a selection direction, namely, whether unipolar capacitors having a higher capacitor voltage are initially selected over the unipolar capacitors having a lower capacitor voltage, as a function of a power flow direction of the converter assembly, as a function of a current direction through the subcircuit, and as a function of whether the instantaneous subcircuit voltage exceeds or falls below the predetermined subcircuit setpoint voltage.

10. The method according to claim 2, which comprises:
in a group formation step in the selection loop, forming a virtual capacitor group made up of the connected capacitors that are operated in unipolar and bipolar mode, and of a fixedly predetermined maximum number of capacitors that are operated in unipolar mode and that are to be selected, but which are still disconnected; and adding the capacitor voltages of the virtual capacitor group to form a virtual voltage value.

11. The method according to claim 10, which comprises forming the virtual voltage value in a voltage comparison step in the selection loop.

12. The method according to claim 10, which comprises:
considering the virtual voltage value to be an instantaneous subcircuit voltage and used the virtual voltage value as the instantaneous subcircuit voltage for comparing the subcircuit setpoint voltage;
creating the sorting list for the virtual capacitor group; and
ultimately selecting the capacitors to be disconnected according to the sequence in the sorting list, until a sum of the capacitor voltages of the remaining capacitors equals the predetermined subcircuit setpoint voltage, or at least corresponds up to a predetermined residual error, or falls below the predetermined subcircuit setpoint voltage.

13. The method according to claim 10, which comprises selecting the capacitors that are operated in unipolar mode, but are still disconnected, from the overall group of the disconnected capacitors that are operated in unipolar mode, according to their capacitor voltages.

14. The method according to claim 10, which comprises forming the virtual capacitor group with those disconnected unipolar capacitors that:
have the lowest capacitor voltages in the case of a power flow direction of the converter assembly in a direction of the DC voltage terminals; and
have the highest capacitor voltages in the case of a power flow direction of the converter assembly in a direction of the AC voltage terminal or terminals.

15. The method according to claim 6, which comprises:
in a group formation step of the selection loop, forming a virtual capacitor group that is made up of physically connected capacitors that are operated in unipolar and bipolar mode, and a predetermined maximum number of capacitors that are operated in unipolar mode which are selected but still physically disconnected; and
when creating the sorting list, adding all capacitors in the virtual capacitor group to the sorting list;
handling the capacitors that are operated in unipolar mode which are selected but still physically disconnected in the sorting list exactly like the physically connected capacitors that are operated in unipolar mode.

16. The method according to claim 6, which comprises, in the selection loop:
in an ascertainment step, ascertaining the capacitors which are to be disconnected or connected for achieving the predetermined subcircuit setpoint voltage based on a sorting order in the sorting list; and
in an implementation step, disconnecting or connecting the respective capacitors according to an ascertainment result in the ascertainment step; and
maintaining the capacitors that are operated in unipolar mode and that are selected but still physically disconnected, disconnected if they were to be disconnected according to the ascertainment result, and connecting the capacitors that are to remain connected according to the ascertainment result.

17. The method according to claim 1, which comprises operating the capacitors that are operated in unipolar mode with the same polarity.

18. The method according to claim 1, which comprises operating the subcircuit with a modulation index greater than one.

19. A converter assembly, comprising:
at least one AC voltage terminal for outputting or drawing an alternating current;
at least two DC voltage terminals for outputting or drawing a direct current;
at least one series circuit having outer terminals forming said DC voltage terminals, said series circuit including two subcircuits connected in series and having an electrical connecting node forming said at least one AC voltage terminal, and said subcircuits respectively having at least two submodules connected in series, each with at least two switches and one capacitor; and
a control device for activating said submodules in accordance with the method according to claim 1.

* * * * *